(No Model.)
S. P. SAWYER.
COTTON SEED PLANTER.
No. 516,613.               Patented Mar. 13, 1894.
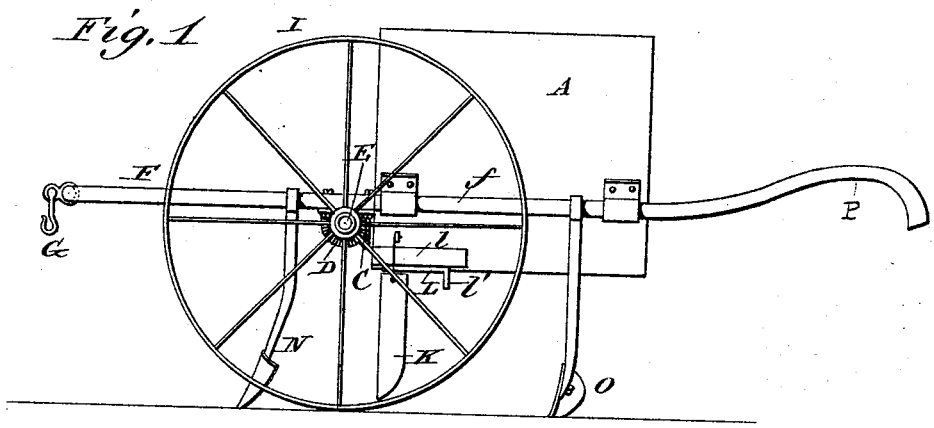
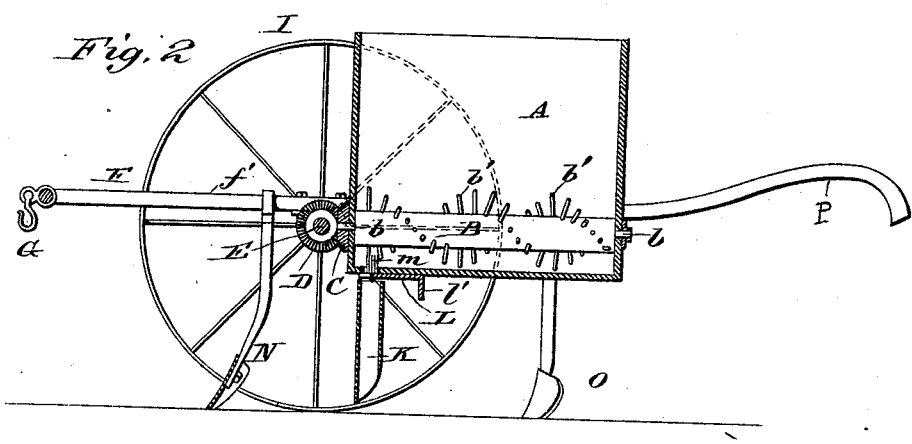
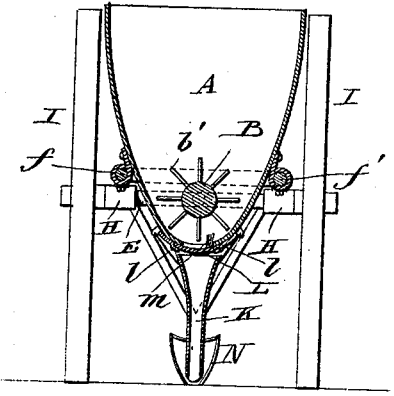
Witnesses:
J. F. Coleman
Henry Jones
Inventor
Samuel P. Sawyer
By S. C. Fitzgerald
Atty

UNITED STATES PATENT OFFICE.

SAMUEL P. SAWYER, OF VALLEY VIEW, TEXAS.

COTTON-SEED PLANTER.

SPECIFICATION forming part of Letters Patent No. 516,613, dated March 13, 1894.

Application filed November 6, 1893. Serial No. 490,070. (No model.)

*To all whom it may concern:*

Be it known that I, SAMUEL P. SAWYER, a citizen of the United States, residing at Valley View, in the county of Cook, State of Texas, have invented certain new and useful Improvements in Cotton-Seed Planters; and I do hereby declare the following to be a full, clear, and exact description of the invention, such as will enable others skilled in the art to which it appertains to make and use the same.

My invention relates to improvements in cotton-seed planters.

The invention will first be described in connection with the accompanying drawings, and then particularly pointed out in the claim.

In the drawings—Figure 1 is a side elevation of a machine embodying my invention. Fig. 2 is a longitudinal central section of Fig. 1, the feed drum being shown in elevation. Fig. 3 is a cross section of Figs. 1 and 2, showing the feed mechanism.

Referring to the drawings, A is a hopper which has downward tapering sides and a rounded bottom, as fully shown in Fig. 3, from which it will be seen that a cross-section of the hopper appears as a semi-ellipse. The ends of the hopper are straight. Within the hopper is a feed drum B having bearings $b$ journaled in the ends of the hopper, one bearing projecting beyond the hopper and being provided with a bevel-pinion C which meshes with a bevel wheel D fixed on the main shaft E. The seed hopper is secured between the two arms $f$ and $f'$ of a frame formed of one integral bar F bent as shown, a draft hook G being secured at the forward end by means of which a team may be hitched to the planter. The main shaft E is mounted in boxes H, fixed to the under side of the arms $f, f'$ and outside the frame two wheels I are fixed to the axle. The feed-drum B is provided with teeth $b'$ preferably arranged spirally, as shown, and tending to force the cotton seed contained in the hopper in the direction of the travel of the planter. Near the front end of the hopper is a slot or opening, formed in the bottom of the hopper, and a seed pipe K carries the seed from the opening to the ground.

To regulate the supply of seed to the seed-pipe a slide L is provided, being mounted in slideways $l$ secured to the under side of the hopper, the end of the slide or cut off being V-shaped and projecting through the upper end of the seed pipe; a handle $l'$, secured to the slide serves as a means to move it back and forth as desired, the position of the V shaped end of the slide, with relation to the slot, determining the amount of seed passing through the seed pipe. To prevent the seed from being carried around by the teeth of the feed drum the slide is provided with a brush $m$ which bears against the teeth of the drum and wipes the seed off into the seed pipe.

The frame F carries a forward plow or shovel N which opens a furrow for the seed, and also two rear shovels O, which cover the seed after it is dropped. Suitable handles P are also secured to the frame.

The operation of my machine is as follows: The seed to be planted is placed in the hopper and the team driven ahead. The revolution of the main wheels revolve the feed drum through the mechanism of the bevel gears. The seed is forced along the bottom of the hopper by the teeth on the feed drum whereupon the seed falls through the V-shaped opening in the slide down through the seed pipe to the ground in the furrow formed by the front plow or shovel. The brush attached to the slide insures the droping of the seed as it prevents the seed from being carried around by the teeth. The amount of seed dropped may be regulated by moving the slide back or forward, thereby enlarging or contracting the size of the opening into the feed pipe. When desired the slide may be pushed forward far enough to entirely shut off the seed from the pipe.

Having thus fully described my invention, what I claim as new, and desire to secure by Letters Patent, is—

In a cotton-seed planter, the combination with the frame consisting of a bar having its extremities bent rearwardly to form handles, of the supporting wheels and their shaft journaled in said frame, the hopper having a rounded bottom and inclined sides, said hopper being secured between the bent extremities of the frame behind said supporting wheels with its bottom projecting below the frame and provided with an opening, a feed drum journaled in said hopper and provided with spirally arranged pins adapted to feed the seed along the bottom of the hopper to the opening therein, means for actuating the said feed drum from the movement of the supporting wheels, a seed spout arranged under the opening in the bottom of the hopper, guides arranged on opposite sides of said opening, and a slide mounted in said guides and adapted to close the opening in the bottom of the hopper, said slide having a brush which projects through said opening into the path of the pins on the feed drum, substantially as described.

In testimony whereof I affix my signature in presence of two witnesses.

SAMUEL P. SAWYER.

Witnesses:
    Mrs. M. L. RILEY,
    MARY CALCOTE.